Oct. 18, 1927.
O. SEKINGER
1,645,545
LIQUID DISPENSING APPARATUS
Filed Oct. 19, 1923  3 Sheets-Sheet 1
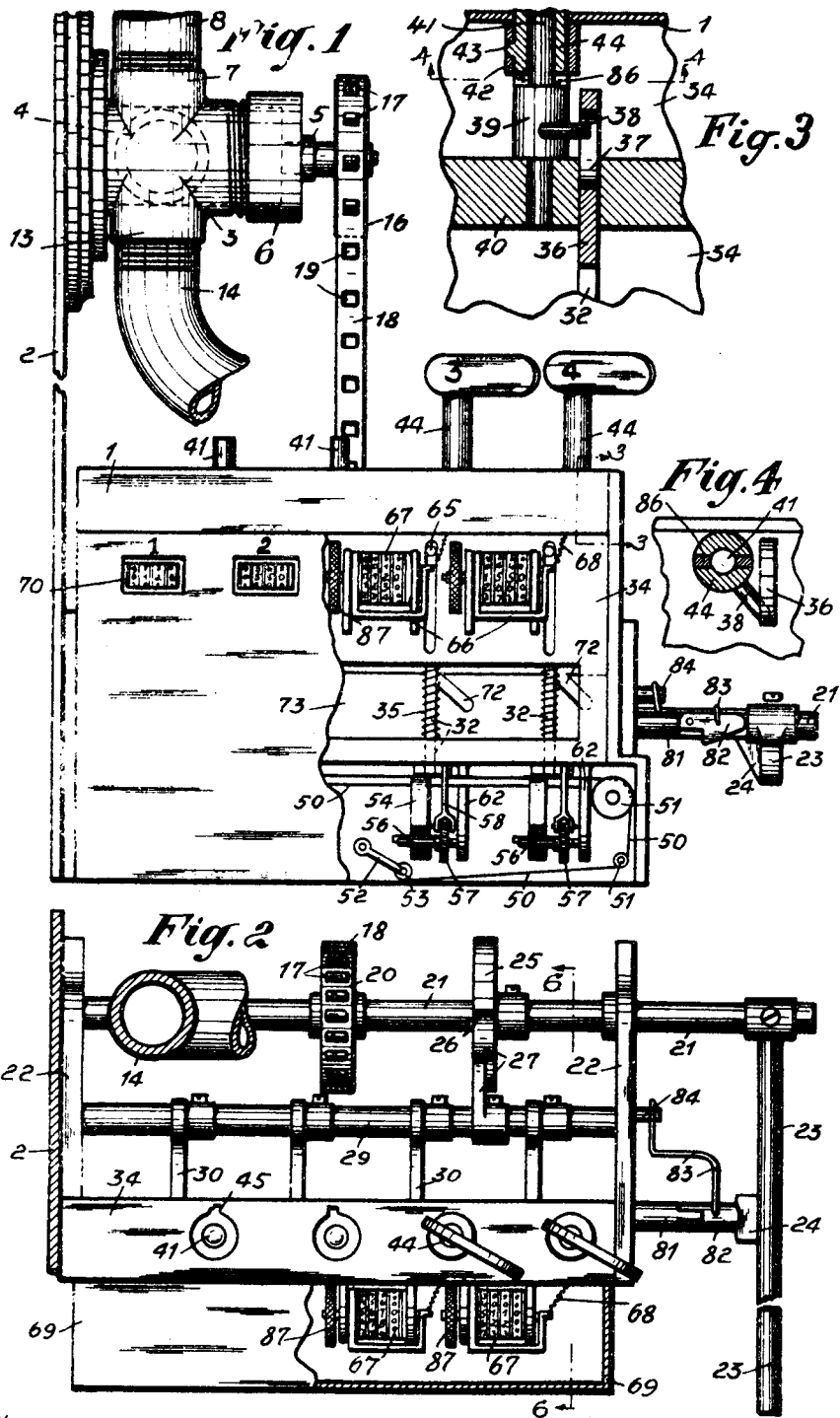

Oct. 18, 1927.  1,645,545
O. SEKINGER
LIQUID DISPENSING APPARATUS
Filed Oct. 19, 1923  3 Sheets-Sheet 2
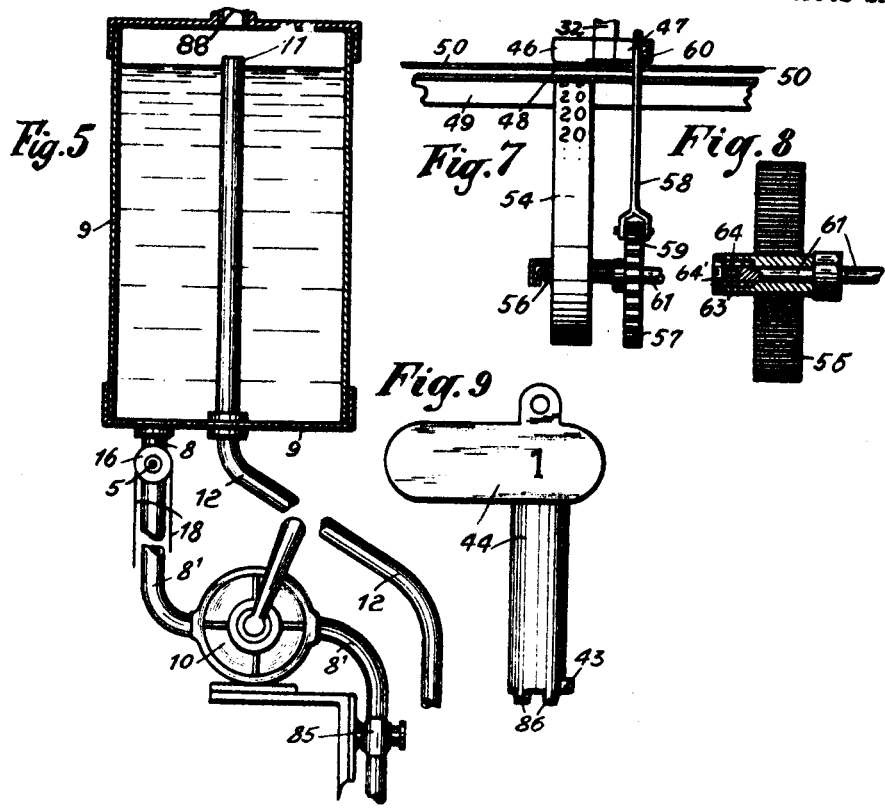
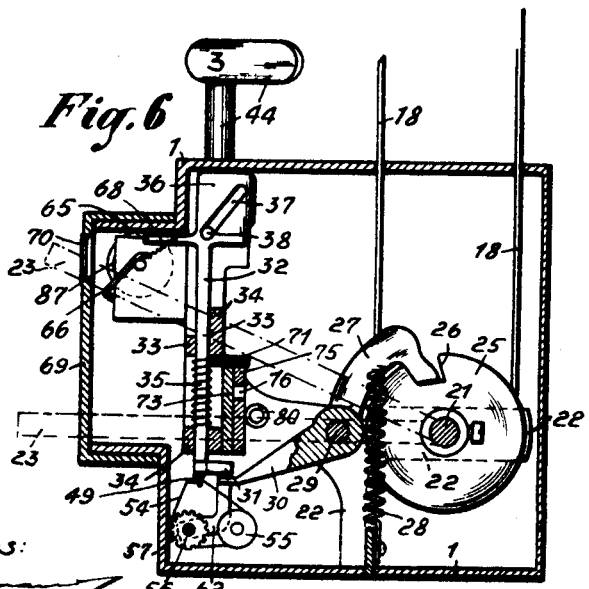

Oct. 18, 1927.
O. SEKINGER
1,645,545
LIQUID DISPENSING APPARATUS
Filed Oct. 19, 1923    3 Sheets-Sheet 3
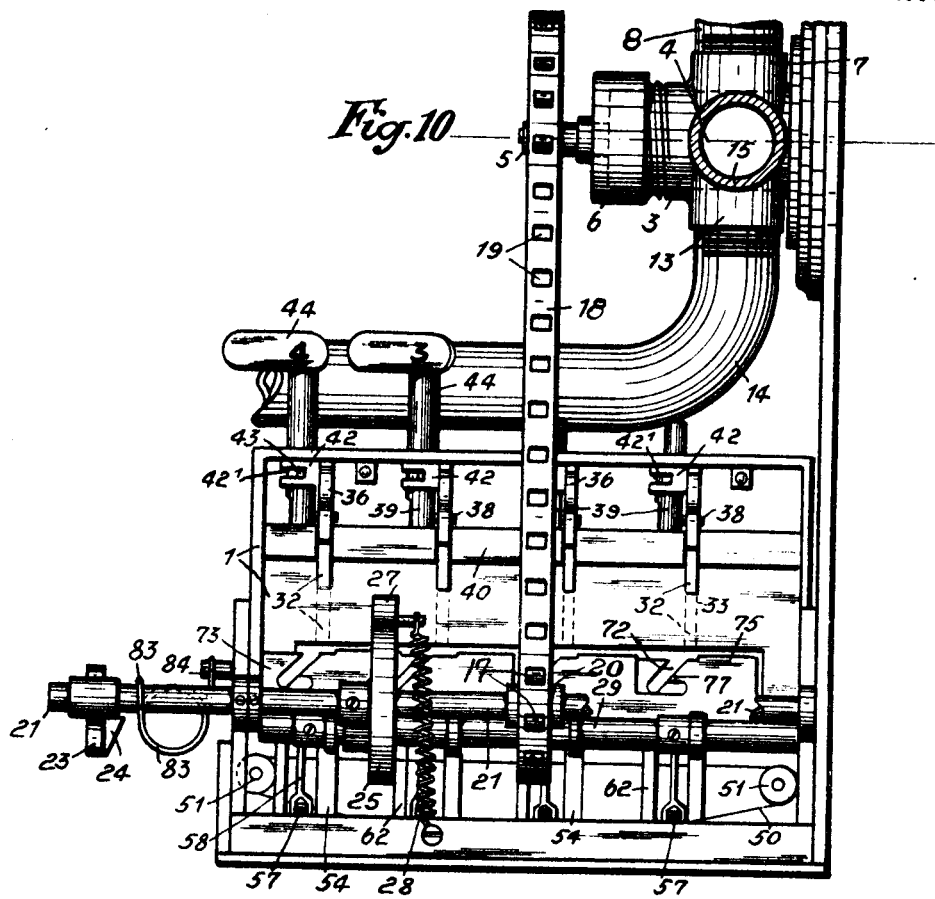
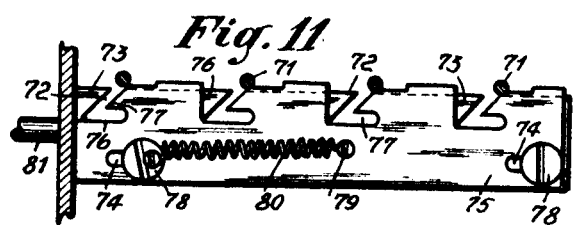
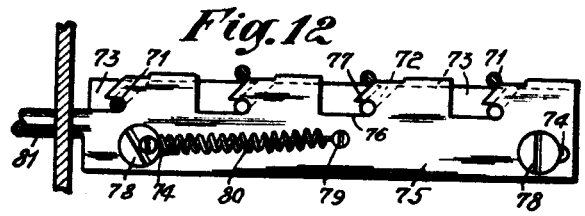
Witnesses:
Inventor:
Otto Sekinger Patented Oct. 18, 1927.

1,645,545

UNITED STATES PATENT OFFICE.

OTTO SEKINGER, OF ZURICH, SWITZERLAND, ASSIGNOR TO ALTORFER, LEHMANN & CIE., ZENTRALHEIZUNGSFABRIK, OF ZOFINGEN, SWITZERLAND, A FIRM.

LIQUID-DISPENSING APPARATUS.

Application filed October 19, 1923. Serial No. 669,481.

Apparatus for delivery of liquids have become known in which the quantity of liquid delivered is indicated on a scale. The apparatus of this type must however be controlled by a trustworthy person as otherwise difficulties might arise especially when different persons draw off the liquid.

This invention relates to an apparatus for the delivery of liquids, especially benzin, the delivery being controlled so that liquid can be dispensed only when the quantity dispensed is automatically recorded at the same time by that counter and recorder which belongs to the person who is using the apparatus.

According to the invention a multiple way cock is mounted in the pipe which communicates with a reservoir, a measuring vessel and an outflow pipe, a hand lever being provided for the operation of this cock. This hand lever is locked by a mechanism adapted to be operated by keys. Every time the releasing mechanism is operated with the aid of one of a number of keys the apparatus is connected with the recorder which corresponds to the key which has been used, the quantity of liquid which has been tapped being recorded accordingly.

The invention will be best understood from a consideration of the following detailed description taken in connection with the accompanying drawing forming a part of this specification, with the understanding that while on the drawings one embodiment of the invention is disclosed, the invention is not confined to any strict conformity with the showing of the drawings, but may be embodied in any manner which does not make a material departure from the salient features of the invention.

In the drawings:—

Fig. 1 is a front elevation partly in section.

Fig. 2 is a top plan view partly in section.

Fig. 3 is a section on line 3—3 of Fig. 1 on enlarged scale.

Fig. 4 is a section on line 4—4 of Fig. 3 and shows the locking element in the lowest position.

Fig. 5 shows partly in section and partly in elevation the measuring vessel with feed pump.

Fig. 6 is a section on line 6—6 of Fig. 2.

Fig. 7 shows a recorder mechanism in elevation.

Fig. 8 is a section through the unwinding roller.

Fig. 9 shows one of the keys on larger scale.

Fig. 10 is a rear elevation of Fig. 1.

Fig. 11 shows the bars in elevation.

Fig. 12 is a similar view as Fig. 11 showing the bars in different position.

On a casing 1 a vertical plate 2 is mounted on the upper part of which the casing of the three-way cock 3 is arranged. The plug 4 of the three cock 3 is keyed on a bolt 5 which traverses the lid 6 and projects from the same. A pipe 8 leads from the tubular socket 7 to the measuring vessel 9. In the conduit 8¹ a pump 10 is mounted which is adapted to be operated by a hand lever. The vessel 9 consists of a glass cylinder so that the liquid level in the vessel is clearly visible from the outside. In the vessel 9 a standpipe 11 is axially arranged and a return pipe 12 is connected with this standpipe. The vessel 9 is of determined capacity, 10, 20, 25 or more liters. When this capacity has been reached the liquid level is at the upper open end of the standpipe 11 so that all the liquid which is further filled in flows out through the standpipe 11 and back to the tank through the return pipe 12.

The discharge pipe 14 mounted in the tubular socket 15 may have connected therewith, as usual, a flexible tube or hose pipe to facilitate the supply of the discharging liquid to motor cars. The feed pipe 8¹ leading to the benzin tank is mounted on the tubular socket 15.

A disk 16 keyed on a bolt 5 has teeth on its circumference which are designed to engage with corresponding holes 19 of an endless metal band 18 guided on a disk 20 keyed on shaft 21. The teeth 17 of disks 16 and 20 engage also with the holes 19 of the metal band 18.

The shaft 21 is journalled in the uprights 22. On the end of shaft 21 projecting from one of the uprights 22 a handlever 23 is keyed on the middle arm of which a wedge shaped projection 24 is arranged. 25 is a stop disk mounted on shaft 21 and having a notch 26 with which the locking pawl 27 engages. This locking pawl 27 is, under the action of a spiral spring 28, pulled against the disk 25. When the locking pawl 27 is in engagement with notch 26 the stop disk is locked and through the same, shaft 21 and the cock plug 4.

The locking pawl 27 is keyed on the rod 29 which is journalled in the uprights 22. On this rod 29 feelers or pawls 30 are mounted at convenient distances apart the one from the other, the free ends of said feelers 30 standing below the catches 31 of the rods 32. The rods 32 are guided in a vertical groove 33 of the transverse bar 34 which connects the two uprights 2 with one another and they are maintained by the action of the spiral springs 35 in the working position. The rods 32 are rigidly connected with locking bodies 36. The locking bodies 36 have each a diagonal slot 37 with which engages a stud 38 mounted on a rotary body 39. These rotary bodies 39 are mounted in a ledge 40 of the transverse bar 34 and carry guide bolts 41 for the keys. On the wall of the casing, sleeves 42, one for each bolt 41, are arranged. The sleeves 42 have horizontal slots $42^1$ designed to receive nipples 43 of the keys 44. A vertical groove 45 communicates with the slots $42^1$. When a key is being inserted and turned its nipple 43 engages with the slot $42^1$ so that the key can be withdrawn only after it has been turned. In this manner it is prevented that the key be prematurely removed in order to carry out any forbidden manipulations.

When a key is being rotated the corresponding rotary body 39 is rotated also and the stud 38 of the body 39 which slides in the oblique slot 37 of the locking body 36 makes this locking body move down so that the locking rod 32 acts upon the corresponding feeler 30 so that by the rotation of rod 29 the locking pawl 27 is oscillated and comes out of engagement with the locking disk 25.

The locking rods have at the lower ends two projections 46, 47 (Fig. 7) of which one, 46, carries a figure type 48 indicating the volume corresponding to the capacity of the vessel 9, for instance 20. Below the projections 46 a bar 49 is arranged on which the inking ribbon 50 slides. The inking ribbon is endless and guided over pulleys 51. A counter-weighted lever 52 has at one end a roller 53 adapted to roll upon the inking ribbon so that it is stretched by the action of the weight of lever 52 and of the roller 53. The paper strip 54 is guided between the printing bar 49 and the inking ribbon 50 and it winds off spool 55 and on spool 56. A toothed wheel 57 keyed upon the axle of spool 55 engages a stud 59 fixed in the fork shaped end of the feed lever 58. This feed lever 58 is oscillatably suspended by means of screw 60 on the projection 47. One of the pulleys 51 is successively rotated by a feeding mechanism analogous to that (56, 58, 59) of the winding up spool.

When the locking rod 32 and its projection 47 descend, the feed lever 58 is lowered and the toothed wheel 57 is revolved by the stud 59 for one unit, whereby the paper strip 54 is advanced. The spools 55 and 56 are loosely mounted on axles 61 journalled in brackets 62. The spool 55 has in its inner wall an incision 63 in which a spiral spring 64 is located. This spring bears on the one hand against a screw $64^1$ fixed on the axle and on the other hand on the shoulder formed by the incision and it exerts a slight braking action upon this spool and prevents accidental rotation of said spool.

The locking rods 32 have each a stud 65 in proximity of the locking body 36 said stud extending into the path along which a feed lever 66 of the counters 67 moves. The counters 67 are composed in the well known manner of figure disks, viz, one for the units, one for the tens, one for the hundreds and one for the thousands. At each downward oscillation of a feed lever 66 caused by the locking rod 32 a feeding for one unit is produced by means of the studs 65, the unit corresponding with the volume (10, 20, 25 liters) of the vessel 9. The feed lever 66 is controlled by a spiral spring 68 so that after it has been released by the stud 65, it returns always to its normal position. The counters 67 are enclosed in a casing 69 which has for each counter one window 70 and is locked by a lock not shown in the drawing.

On the middle arm of each locking rod 32, a bolt 71 is arranged which in the normal position stands over the inclined slits 72 of a rail 73. A second bar 75 is in contact with rail 73 and has indentations 76 which form each a barbed hook 77. The bars 73 and 75 have a slit 74 near each end which slits are traversed each by a screw 78 in the transverse bar 34. A stud 79 on bar 75 is connected by a helical contractile spring 80 with one of the screws 78. The bar 75 tends permanently to move to the left (Fig. 12) under the action of the spiral spring 80. When the locking rod 32 descends, the bolt 71 slides in the slit 77 and in the indentation 76 whereby the two bars are moved to the right (Figs. 11 and 12). When the bolt 71 is in the lowest position registering with the barbed hook 77 and bar 75 is moved to the left by the action of the spiral spring 80 (Fig. 12) so that the stud is locked by the barbed hook 77. In this position the locking rod 32 is prevented from being raised.

The bar 75 has further a bolt 81 projecting from one of the uprights and carrying a drop pawl 82 adapted to oscillate from the horizontal position upward. This pawl 82 is acted upon by a torsion spring 83 fixed by means of screw 84 on one of the uprights 22 designed to maintain the pawl in the horizontal position.

An angle piece 88 on the top plate of the vessel 9 carries a valve in order to prevent pressure above the normal which might be produced by thermic influences. A shutting off cock 85 is mounted in the conduit 8¹ in front of pump 18.

The keys 44 have each a bit or bits 86 designed to engage with corresponding indentations of the rotary bodies. Each rotary body can therefore be operated only by its own key.

The operation of the apparatus is as follows:—

The cock plug 4 is normally in such a position that the conduit 8 communicates with conduit 8¹ so that at the pumping, the liquid from the tank flows through the conduits 8, 8¹ into the vessel 9. The cock 85 in conduit 8¹ must evidently be open. If the level of the liquid arrives at the upper end of the standpipe 11, through which liquid in excess will flow out, the pumping is stopped. In order to tap off the benzin or other liquid the cock plug 4 must be turned so that the conduit 8 is in communication with the pipe 14. With this object in view a key is put on the guide bolt 41 and turned in clockwise direction approximately for one quarter revolution. The locking body 36 makes the locking rod 32 descend by means of stud 38. The stud 65 striking upon the feed lever 66 the counter 67 is advanced accordingly. At the same time the type 48 at the lower end of the rod 32 is printed and records the quantity of benzin which is delivered.

The bolt 71 engaging with slit 72 and identation 76 produces, owing to its downward movement in vertical direction, a displacement of the two bars 73, 75 towards the right (Figs. 11 and 12). The bar 75 jumps back through the action of the spiral spring 80 as soon as bolt 71 passes below the barbed hook 77 so that it is locked. In this position of bar 75 bolt 71 and the locking rod 32 cannot move upward. It is also impossible to remove the key 44 as its nipple 43 engaging with slot 42¹ prevents this.

The projection 31 strikes at the same time upon the feeler 30 and effects a rotation of rod 29 wherefrom results an oscillation of the locking pawl 27 so that it comes out of engagement with the indentation 26 of disk 25. The shaft 21 and consequently disk 20 are now free to be rotated so that disk 16, bolt 5 and the cock plug 4 are rotated also.

The rotation of shaft 21 is effected by the hand-lever 23 which swings from its normal position (dash line in Fig. 6) in upward direction into the position (mixed line). At this oscillation of the hand lever 23 the cock plug 4 is adjusted so that the conduit 8 is made to communicate with the tube 14 mounted on the tubular socket 13 so that the benzin can flow out of the vessel 9.

It is impossible to operate the pump as the cock plug has been adjusted so that the connection of the feed pipe 8¹ on tubular socket 5 with the pipe 8 is interrupted.

In order to release again the hand lever 23 is lowered so that the projection 24 strikes on pawl 82 and presses the same and the bolt 81 in inward direction so that the bar 75 is moved to the right (Fig. 12). At this displacement of the bar 75 the locked stud 77 is released by the barbed hook 77 and the corresponding locking rod 32 returns under the action of the spiral spring 35 into its upper normal position. By the locking body 36 respectively by means of the slot 37 with which stud 38 engages the rotary body and with the same the keys are brought back to their initial positions so that they can be withdrawn. By the oscillation of lever 23 shaft 21 had been rotated so that through the intermediary of the endless metal band guided over disk 20 the cock plug 4 has been rotated. The locking pawl 27 comes again in engagement with the notch 26 of disk 25 so that the shaft 21 can not be rotated without previous operation of the locking device (32, 37) and consequently of the counter 67 and of the printing mechanism. It is therefore impossible to tap any benzin without recording.

The several keys differ from one another by the position of the bits 86 so that a determined releasing mechanism can be operated only by a determined key.

To bring one of the counters 67 to the zero position, which will be necessary after the quantity tapped by a determined purchaser has been paid, the casing 69 is removed and all the figure disks of the counter are brought back to the zero position with the aid of the zero wheel 87.

The keys 44 may be of other construction as shown and the elements 39, 41 must be modified in accordance with the modification of the keys.

The apparatus described and shown is specially designed for garages, taxi-autos and the like, or other places where different persons tap determined quantities of liquid and where the delivery of liquid has to be recorded and controlled.

I claim:—

1. In a dispensing apparatus, a key actuable locking and releasing mechanism comprising a locking rod, a reciprocating bar having an oblique slot opening through one of its edges, a second reciprocating bar in operative relation to the first-mentioned bar and having a vertical notch opening through one of its edges and formed to provide a barbed hook, a spring controlling the second-mentioned bar, and a projection on the rod arranged for coaction with said slot and notch in said bars.

2. In a dispensing apparatus, a rotary valve, a sprocket wheel coupled to said valve, a lever for operating the valve, a shaft actuated by said hand lever, a locking mechanism on said shaft for locking said lever in the inoperative position, a sprocket wheel on said shaft of the lever, an endless chain connecting said sprocket wheel of the lever shaft with the sprocket wheel of the valve, a number of releasing mechanisms for releasing said locking mechanism, and means for operating the releasing mechanisms differing the one from the other.

3. In a dispensing apparatus, a rotary valve, an axle for operating the valve, a sprocket wheel on said axle, a lever, a shaft actuated by said lever, a locking disk on said shaft of the lever having a notch, a locking pawl engaging with said notch of the locking disk, a shaft on which said pawl is keyed, a sprocket wheel on said shaft of the lever, an endless chain connecting said sprocket wheel of the lever shaft with the sprocket wheel of the valve, a number of releasing mechanisms for releasing said locking mechanism, one feeler for each releasing mechanism said feelers being mounted on said shaft of the locking pawl and adapted to be operated by the corresponding releasing mechanism, and means for operating the releasing mechanism differing the one from the other.

4. In a dispensing apparatus, locking and releasing mechanism comprising a locking rod, a pair of reciprocating bars, means for shifting said bars in one direction on an operative movement of the locking rod, means for shifting one bar in the opposite direction with regard to the other bar when said bars are in the first-named shifting position, an operating device, and means actuated by said device for shifting the second-named bar back to its normal position.

5. In dispensing apparatus of the type described, a valve, a rotatable shaft operatively connected to the valve, means for locking the shaft against rotation, and plural, individually-operable means for releasing the shaft.

6. In dispensing apparatus of the type described, a valve, a rotatable shaft operatively connected to the valve, a pawl for locking the shaft against rotation having a free end adapted to be depressed to disengage the pawl from the shaft, and key-operated means for depressing the free end of said pawl.

7. In dispensing apparatus of the type described, a valve, a rotatable shaft operatively connected to the valve, a pawl for locking the shaft against rotation having a free end adapted to be depressed to disengage the pawl from the shaft, a slidable rod arranged within the casing to engage and depress said free end of the pawl, and key operated cam means for operating the rod.

8. In an apparatus of the type described the mechanism for locking the locking rod and the key in the releasing position to prevent the refilling of the measuring vessel, comprising in combination with the locking rods, a bar movably mounted in the machine frame having oblique slits upwardly projecting from its upper edge, a second bar movably mounted in the machine frame in contact with said first-mentioned bar and having vertical slits shaped to form barbed hooks, a spring controlling said second mentioned bar, and a bolt laterally projecting from said locking rod designed to engage with the corresponding oblique slit of the first mentioned bar so that the two bars are pushed to the right whereupon the second mentioned bar is pulled by the action of the spring so that the barbed hook locks the bolt of the locking rod.

9. In an apparatus of the type described the mechanism for locking the locking rods in the releasing position comprising in combination with the locking rods, two bars movably mounted in contact with one another in the machine frame, means for shifting said bars at the depression of a locking rod, means for shifting one bar with regard to the other bar when they are in the shifted position so that the corresponding locking rod is locked between said bars, an outwardly projecting bolt of the second locking bar, a pawl on said bar adapted to swing in upward direction, and means for depressing said pawl when the hand lever of the apparatus is being depressed, so that the second locking bar is shifted to release the locking rod.

10. In dispensing apparatus of the type described, a valve, a rotatable shaft operatively connected to the valve, a pawl for locking the shaft against rotation having a free end adapted to be depressed to disengage the pawl from the shaft, a slidable rod arranged within the casing to engage and depress said free end of the pawl, said rod having a cam slot, a key-rotated member, and a pin carried by the latter for operating in the slot to effect sliding of the rod.

11. In dispensing apparatus of the type described, a valve, a rotatable shaft operatively connected to the valve, a pawl for locking the shaft against rotation having a free end adapted to be depressed to disengage the pawl from the shaft, a slidable rod arranged within the casing to engage and depress said free end of the pawl, key-operated means for sliding the rod, means for locking the rod depressed.

12. In dispensing apparatus of the type described, a valve, a rotatable shaft operatively connected to the valve, a pawl for locking the shaft against rotation having a free end adapted to be depressed to disengage the pawl from the shaft, a slidable rod arranged within the casing to engage and depress said free end of the pawl, key-operated means for sliding the rod, a lateral projection on the rod, means engageable with the projection to lock the rod depressed, and means operable by the shaft for rendering the locking means inoperative.

13. In dispensing apparatus of the type described, a valve, a rotatable shaft operatively connected to the valve, a pawl for locking the shaft against rotation having a free end adapted to be depressed to disengage the pawl from the shaft, a slidable rod arranged within the casing to engage and depress said free end of the pawl, key-operated means for sliding the rod, a pair of relatively slidable locking plates arranged to lock the rod depressed, resilient means urging the plates to operative position, and an arm carried by the shaft for camming against one of the plates to move it relative to the companion plate to release the rod.

14. In dispensing apparatus of the type described, a valve, a rotatable shaft operatively connected to the valve, a pawl for locking the shaft against rotation having a free end adapted to be depressed to disengage the pawl from the shaft, a slidable rod arranged within the casing to engage and depress said free end of the pawl, key-operated means for sliding the rod, means for locking the rod depressed, and means operable by the shaft for rendering the locking means inoperative.

In testimony whereof I affix my signature.

OTTO SEKINGER.